United States Patent [19]

Corrigan et al.

[11] Patent Number: 5,194,071
[45] Date of Patent: Mar. 16, 1993

[54] CUBIC BORON NITRIDE ABRASIVE AND PROCESS FOR PREPARING SAME

[75] Inventors: Francis R. Corrigan, Westerville; Barbara R. Sweeting, Powell; Samuel A. Anthony, III, Westerville, all of Ohio

[73] Assignee: General Electric Company Inc., New York, N.Y.

[21] Appl. No.: 735,503

[22] Filed: Jul. 25, 1991

[51] Int. Cl.5 .............................................. B24D 3/00
[52] U.S. Cl. ........................................ 51/293; 51/307; 51/309
[58] Field of Search ........................ 51/293, 307, 309

[56] References Cited

U.S. PATENT DOCUMENTS

| | | | |
|---|---|---|---|
| 2,947,617 | 8/1960 | Wentrof, Jr. | 51/307 |
| 3,136,615 | 6/1964 | Bovenkerk et al. | 51/307 |
| 3,233,988 | 2/1966 | Wentrof, Jr. | 51/307 |
| 3,743,489 | 7/1973 | Wentorf, Jr. et al. | 51/307 |
| 3,767,371 | 10/1973 | Wentorf, Jr. et al. | 51/307 |
| 3,918,219 | 11/1975 | Wentrof, Jr. et al. | 51/293 |
| 4,188,194 | 2/1980 | Corrigan | 51/307 |
| 5,000,760 | 3/1991 | Ohtsubo et al. | 51/293 |
| 5,015,265 | 5/1991 | Corrigan et al. | 51/293 |

*Primary Examiner*—Mark L. Bell
*Assistant Examiner*—Willie J. Thompson
*Attorney, Agent, or Firm*—Millen, White, Zelano and Branigan

[57] ABSTRACT

The present invention provides methods for forming cubic boron nitride from large particle ideal structure hexagonal boron nitride. Large particles provide improved packing density within the high pressure, high temperature equipment utilized, providing higher yields from conversion processes which utilize a catalyst and those which do not. This large particle ideal structure HBN can be used with conventional high pressure, high temperature processes to provide CBN particulates, composites and compacts.

13 Claims, No Drawings

CUBIC BORON NITRIDE ABRASIVE AND PROCESS FOR PREPARING SAME

BACKGROUND OF THE INVENTION

This invention relates to the cubic form of boron nitride and its formation or transformation from the hexagonal form of boron nitride. More particularly, this invention relates to utilizing large HBN particles of an ideal structure in forming cubic boron nitride. The processes of this invention include the subjection of the hexagonal form of boron nitride to high pressures and temperatures, both in the absence and presence of a catalyst to form cubic boron nitride.

Three crystalline forms of boron nitride are known: (1) hexagonal boron nitride (HBN), a soft graphitic form similar in structure to graphite carbon; (2) wurtzitic boron nitride (WBN), a hard hexagonal form similar to hexagonal diamond; and (3) cubic boron nitride (CBN), a hard zincblend form similar to cubic diamond. The three boron nitride crystal structures may be visualized as formed by the stacking of a series of sheets or layers of atoms. FIGS. 1-a through 1-c of U.S. Pat. No. 4,188,194 illustrate these three structures in greater detail. In HBN crystals, the boron and nitride atoms bonded together are in the same plane as stacked layers. In the more dense CBN crystal structures, the atoms of the stacked layers are puckered out of plane. In addition, the layers are stacked along the [001] direction in HBN crystals, whereas in the CBN crystal, the layers are stacked along the [111] direction. Furthermore, bonding between the atoms within the layers of an HBN crystal is predominantly of the strong covalent type, with only weak Van derWaals bonding between layers. In CBN crystals, strong, predominantly covalent tetrahedral bonds are formed between each atom and its four neighbors.

It is the cubic form of boron nitride which finds use as an abrasive material typically in the form of a cluster compact, a composite compact, or various types of grinding wheels. A cluster compact is defined as a cluster of abrasive crystals bonded together either in (a) a self-bonded relationship, (b) by means of a bonding medium or (c) by some combination of the two. U.S. Patent Nos. 3,136,615 and 3,233,988 provide a detailed description of certain types of cluster compacts and methods for their manufacture.

A composite compact is defined as a cluster compact bonded to a substrate material, such as a cemented tungsten carbide. The bond to the substrate can be formed either during or subsequent to the formation of the cluster compact. U.S. Pat. Nos. 3,743,489 and 3,767,371 provide a detailed disclosure of certain types of composite compacts and methods for their manufacture.

Cluster compacts and composite CBN compacts are a tough, coherent, high-strength mass of a plurality of chemically bonded CBN crystals used in machine dressing and drilling.

Cubic boron nitride particles are also used as aggregates physically bonded together by a metal matrix such as nickel. A grinding wheel is one example of such an aggregate.

Methods for converting HBN into CBN monocrystalline and polycrystalline particles are well known. U.S. Pat. No. 2,947,617 describes a method for preparing cubic boron nitride by the subjection of a hexagonal form of boron nitride, in the presence of a specific additive material, to very high pressures and temperatures. The pressures and temperatures are within the cubic boron nitride stable region defined by the phase diagram of boron nitride. Cubic boron nitride is recovered after removal of the high-pressure and high-temperature condition. The added material or catalyst is selected from the class of alkali metals, alkaline earth metals, tin, lead, antimony and nitrides of these metals. The cubic boron nitride stable region is that represented in FIG. 1 of U.S. Pat. No. 2,947,617 shown above the equilibrium line on the phase diagram therein.

A method for conversion of HBN to CBN in the absence of catalysts is described in U.S. Pat. No. 3,212,852 under conditions of higher pressures and temperatures. See also: Wakatsuki et al., "Synthesis of Polycrystalline Cubic BN (VI)," and Ichinose et al., "Synthesis of Polycrystalline Cubic BN (V)," both in *Proceedings of the Fourth International Conference of High Pressure*, Kyoto, Japan (1974), pp. 436–445; U.S. Pat. No. 4,016,244; Wakatsuki et al., Japanese Patent No. Sho 49-27518; Wakatsuki et al., Japanese Patent No. Sho 49-30357; Wakatsuki et al., Japanese Patent No. Sho 49-22925; Wakatsuki et al., U.S. Pat. No. 3,852,078; Wakatsuki et al., "Synthesis of Polycrystalline Cubic Boron Nitride," *Mat. Res. Bull.* 7, 999–1004 (1972); and Sirota, N. British Patent No. 1,317,716. Such methods are referred to as direct conversion processes. HBN can be directly converted to CBN compacts in the absence of catalysts according to U.S. Pat. No. 4,188,194. U.S. Pat. No. 3,918,219 teaches catalytic conversion of HBN to CBN in contact with a carbide mass to from a CBN composite body.

In all of these processes, hexagonal boron nitride is used as a starting material. Two forms of hexagonal boron nitride have been identified, the turbostratic structure and the ideal structure. The turbostratic structure is characteristic of pyrolytic boron nitride (PBN) which has continuous two-dimensional layers of hexagonal rings stacked at irregular intervals and randomly oriented. The ideal structure is characteristic of graphitic boron nitride (GBN) wherein the boron and nitride atoms alternate in an orderly and continuous fashion in the stacked sheets of 6 membered rings.

PBN is a low-pressure form of HBN, made typically by chemical vapor deposition of $BCl_3 + NH_3$ vapors on a graphite substrate. As deposited, it has a high purity of 99 99+%, a density of about 2.0-2.18 $g/cm^3$ and a preferred orientation of the layer plates between 50/ and 100/ in the [001] direction. The ideal structure HBN (GBN) has a higher density of 2.28 $g/cm^3$. The interlayer spacing in the pyrolytic materials is also greater than that of the ideal structure HBN (typically 3.42 for PBN compared to 3.33 for GBN).

Both PBN and ideal structure HBN are used as powders for conversion to CBN. Although PBN is available in the form of sheets, it is milled to powder form, which is typically high-aspect ratio plate-like particles which can be sieved to a particular mesh size. The use of large particle PBN has been found to reduce the packing density within the cell of the high pressure equipment used to convert to CBN, which may be undesirable.

Hexagonal boron nitride of the ideal structure has been available as a powder with an average particle size of less than 10 microns, typically 5-6 microns, presumably due to the nature of its manufacture.

In that the ideal structure HBN is provided in the form of particulates, the cell used in high pressure/high temperature equipment cannot be completely packed with material due to spaces between the particles, as with PBN. The density of press-pills obtained from particulates of ideal structure HBN are far below the theoretical maximum of 2.28 gm/cc, typically about 1.85 gm/cc.

In preparing cubic boron nitride from ideal structure hexagonal boron nitride, it is desirable to maximize the density of the HBN starting material in the reaction vessel to maximize the yield from an operating cycle of the high-pressure, high-temperature press and reduce the press-stroke in the equipment utilized.

SUMMARY OF THE INVENTION

It has been found that large particle ideal structure HBN powders, having an average particle size of about 10 microns or above, provide improved packing density. From this discovery, it is an object of the present invention to improve the efficiency of conversion processes for producing CBN from HBN under high pressure, high temperature conditions. This includes both processes which utilize catalysts and those which do not. These large particle HBN powders are suitable for the production of CBN particulates, cluster compacts and/or composite compacts. It is another object to provide high density pressed-pills of such HBN powders and cluster compacts obtained therefrom.

Upon further study of the specification and appended claims, further objects and advantages of this invention will become apparent to those skilled in the art.

A conversion process is provided which comprises subjecting a reaction mixture of ideal structure hexagonal boron nitride having an average particle size of about 10 microns or above and a particle density of about 2.28 gm/cm$^3$ to simultaneous pressure and temperature conditions for a time sufficient to convert the structure of said hexagonal boron nitride to cubic boron nitride, returning the reaction mixture to ambient conditions and recovering cubic boron nitride therefrom. The pressure and temperature selected are determined by the equilibrium line of a boron nitride phase diagram.

Also provided are high density pressed-pills comprised of ideal structure HBN particles and CBN cluster compacts obtained therefrom.

DETAILED DESCRIPTION OF THE PREFERRED EMBODIMENT

A starting material for the practice of this invention is ideal structure hexagonal boron nitride also referred to as graphitic boron nitride (GBN), having an average particle size of about 10 microns or above, preferably about 15-50 microns. This material is of a larger particle size than the conventional commercially available powders that are 99.8+% pure and are a white, slippery, solid material of a density of about 2.28 g/cm$^3$.

These HBN particles are converted to CBN under conventional high pressure and high temperature conditions with conventional equipment. The term "conversion" is employed generically to denote the change or changes which occur in the hexagonal form of boron nitrides to the cubic form of boron nitride. Conversion reactions wherein the crystal structure of the hexagonal form of boron nitride is caused to change directly to a cubic form of boron nitride crystal structure with or without a catalyst material to facilitate the process are included. Processes which do not utilize a catalyst are preferred.

The process of the present invention may be carried out with any conventional high pressure/high temperature apparatus utilizing conventional pressures and temperatures required for conversion. An apparatus of the type described in U.S. Pat. No. 2,941,248 is an example of a satisfactory press. The high pressure, high temperature apparatus described therein includes a pair of cemented tungsten carbide punches and an intermediate belt or die member of the same material. The die member has an aperture in which a reaction vessel is positioned. Thermally insulating and electrically nonconducting gasket assemblies comprised of pyrophyllite are positioned between the punches and die.

The reaction vessel in one preferred form includes a hollow-walled cylinder of a material such as a ceramic composite which (a) is not converted during high pressure, high temperature operation to a stronger, stiffer state, and (b) has substantially no volume discontinuities occurring under the application of high pressures and temperatures. Other materials that meet these criteria are well known. Positioned concentrically about the reaction vessel is a graphite electrical resistance heater which in turn is positioned within a cylindrical insulating liner.

The apparatus includes other components to provide insulation and electrical connection which can vary significantly in configuration. Other apparatus and configurations are capable of providing the required pressures and temperatures for conversion. For example, carbaloy cemented carbide grade 55A is another satisfactory material for the die member which is capable of withstanding pressures in the range of 100 to above about 200 kilobars.

The reaction mixture used in the process of the present invention can comprise essentially ideal structure HBN or it can additionally contain an additive or catalyst. Additives include CBN crystals which are added before conversion of the HBN. Where the additive used is CBN crystals, the amount can range from 1% to 50% by weight of the total weight of the pressed pill formed and/or the reaction medium. Where a catalyst is used, the ratio of the catalyst material to the hexagonal boron nitride may vary within extremely wide limits, preferably from 0.05 to 40 wt. %. However, in order to have an efficient reaction, the amount of boron nitride present should be sufficient to provide the nitrogen required for complete conversion of the metallic catalyst to the catalyst nitride.

It is believed that the catalyst is first converted to its nitride and the remaining boron nitride dissolves in the catalyst nitride and is subsequently reprecipitated as cubic boron nitride. When the catalyst employed is a nitride, there is no limitation on the relative amounts of the catalyst nitride and the boron nitride employed. Suitable catalysts include those well known in the art such as those selected from the class of alkali metals, alkaline earth metals, tin, lead antimony and the carbide, oxide, borides and nitrides of these metals.

Examples of suitable procedures for the conversion to cubic boron nitride are described in U.S. Pat. No. 2,947,617. Typically, a pyrophillite reaction vessel containing ideal structure hexagonal boron nitride and a catalyst is placed in the reaction chamber of a high pressure/high temperature apparatus where compression of oppositely positioned concentric frustoconical punches raises the pressure to a desired level and the temperature required is obtained by (1) induction heating, (2) passing an electrical current through the starting material or (3) winding heating coils around the reaction vessel. Pressures and temperatures are adjusted to provide reaction conditions above the hexagonal boron nitride-cubic boron nitride equilibrium line on the phase diagram of boron nitride. Cubic boron nitride is recovered upon returning the reaction vessel to ambient conditions. The ideal structure HBN is compacted into the cylindrical aperture defined by two punches and subjected to pressures of 20,000–100,000 atmospheres.

In converting ideal structure hexagonal boron nitride to cubic boron nitride by the method of the present invention, it is difficult to measure the pressure and temperature to which the reactants are subjected by direct means because of the extreme pressures employed. Therefore, each of the conditions is measured by indirect means. In measuring the pressure, recognition is made of the fact that certain metals undergo distinct changes in electrical resistance at particular pressures. Thus, bismuth undergoes a phase change at 24,800 atmospheres, thallium undergoes such a change at 43,500 atmospheres, cesium undergoes such a change at 53,500 atmospheres and barium undergoes such a change at 77,400 atmospheres. By determining the hydraulic pressure load necessary to cause a phase change in a metal such as bismuth, a point on the pressure-pressload curve is determined. By carrying out the same operation with other metals such as thallium, cesium and barium, whose phase-change points are known, a series of points on a pressure-pressload curve are obtained.

The melting point of germanium varies directly with pressure over an extremely wide pressure range. The change in melting point for germanium with pressure has been found to be a straight line when the pressure is determined by the pressure-pressload curves described above. Therefore, by applying other pressloads to a reaction vessel filled with germanium and determining the melting point of germanium, the actual pressure in the chamber at a given pressload can be determined.

The temperature in the reaction vessel can be determined by conventional means such as by placing a thermocoupling juncture in the reaction vessel and measuring the temperatures of the junction in the usual manner. Electrical energy at a pre-determined rate is supplied to the apparatus and a temperature produced by this power is measured by the thermocouple assembly. This same procedure is repeated a number of times with different power inputs to produce a calibration curve of power input versus temperature in the reaction vessel. After a calibration of the apparatus is obtained by this method, the temperature of the contents of the reaction vessel is determined by the power input to the apparatus in conjunction with the calibration curve. In general, to produce a temperature of about 1800/C. in the apparatus described in U.S. Pat. No. 2,941,248, an alternating current voltage of about one to three volts at a current from about 200 to 600 amperes is used to deliver the required 600 to 700 watts through the graphite heating tube.

Various bonding or electrical conducting agents such as metals, for example, may be mixed with boron nitride as a starting material for electrical conducting properties. With such a reaction mixture, the use of capacitor discharge type of heating provides higher temperatures and higher pressures before extensive melting or decomposition takes place. Thus, the metal walls of the apparatus are not subjected to such extreme and injurious temperatures.

The pressure temperature curves of the boron-nitride phase diagram indicate to a varying degree maximum temperature limits within which the cubic boron nitride-forming reaction may take place. While as a practical matter, economics would dictate the use of temperatures and pressures not too far above the indicated minimums, it is evident from the curve that there is an ample pressure and temperature range within which the best mode of carrying out the invention can be practiced.

The particles used in this invention may be subjected to the conventional pretreatment steps such as those described in U.S. Pat. No. 4,289,503 where the powder is vacuum-heated and fired to remove volatile impurities, particularly surface oxide contaminants (boron oxide). This vacuum firing is performed at the thermal decomposition temperature or a range of temperatures where, in addition to degassing the surface oxide contaminants, a thin coating of free boron is generated from decomposition on the surfaces of the oxide-free powder particles.

Cubic boron nitride obtained by the means of this invention is widely applicable for industrial purposes in the same manner as natural diamonds, for example, as abrading or cutting materials. The process of this invention provides the advantage of increased packing density within the cell of high pressure/high temperature apparatus used for the HBN starting material with a resulting increase in product yield. This process also allows for a decrease in the press-stroke necessary during the conversion process.

Also provided by this invention are pressed-pills comprised of ideal structure HBN of a large particle size. Where little or no catalyst is used, such pressed-pills have a density greater than 2.00 gm/cc, which is higher than pressed-pills obtained from conventional HBN powders. To form the pressed-pill, the HBN particulates are compressed at low temperature, preferably at ambient temperature. This pressed-pill can be used in a high pressure/high temperature apparatus for conversion to CBN.

The pressed-pill may also contain the catalyst desired for conversion and/or the powder may be mixed with CBN crystals in an amount of from 1 to 50 wt. %, based on the total weight of the pressed-pill. The density of the pressed-pill will vary with the quantity and density of these additive materials.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, are hereby incorporated by reference.

EXAMPLE

Packing density tests were made with (a) large particle (30-micron average particle size) ideal structure HBN powder and (b) small particle (less than 10 micron, about 5–6 micron average particle size) ideal structure HBN powder currently used in conventional conversion processes. Comparisons were made with (1) the powder in the as-received from, (2) after vacuum firing in the thermal decomposition range and (3) with vacuum-fired powders mixed with 20 wt. % crystal CBN.

The density measurements were made by packing the powders in a hardened steel mold and plunger set with a Carver press to form a press-pill. A set quantity of each powder (8.0 grams) was weighed and inserted into the mold and pressed at a set force (21,000 pounds-63,000 PSI on the 0.65-inch plunger). After force release, the pressed powder was pushed from the mold into a bushing/heater assembly (0.65 inches diameter) and the pressed pill height in the assembly was measured, allowing the density to be calculated. The results are shown below.

|  | Density (grams/cm$^3$) | % Theoretical |
|---|---|---|
| Unfired Ideal Structure HBN Powder | | |
| Large Particle HBN | 2.07 | 90.8 |
| Small Particle HBN | 1.89 | 82.9 |
| Theoretical | 2.28 | — |
| Fired Ideal Structure HBN Powder | | |
| Fired Large Particle HBN | 2.07 | 90.8 |
| Fired Small Particle HBN | 1.84 | 80.7 |
| Theoretical | 2.28 | — |
| HBN/CBN Powder Mixture | | |
| 80% Fired Large Particle HBN/ 20% CBN Additive | 2.19 | 86.9 |
| 80% Fired Small Particle HBN/ 20% CBN Additive | 1.98 | 78.6 |
| Theoretical | 2.52 | — |

The results show consistent improvement in the pill density obtained with large particle HBN. Samples of packed, vacuum fired powder of a large particle size were pressed at high temperature/high pressure conditions for conversion to CBN yielding well-sintered crystalline CBN slugs.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for forming cubic boron nitride, which comprises subjecting ideal structure hexagonal boron nitride particles having an average particle size of 10-50 microns to simultaneous pressure and temperature conditions for a time sufficient to convert the ideal structure hexagonal boron nitride particles to cubic boron nitride and recovering the cubic boron nitride formed.

2. A method as in claim 1, wherein the pressure and temperature have values that correspond to a point above the equilibrium curves on the phase diagram for boron nitride.

3. A method as in claim 1, wherein 0.05 to 40 wt. % catalyst material is mixed with the ideal structure hexagonal boron nitride.

4. A method as in claim 1, wherein 1-50 wt. % cubic boron nitride crystals are mixed with the ideal structure hexagonal boron nitride.

5. A method as in claim 1, wherein the ideal structure HBN is pretreated before conversion by vacuum firing and has a particle size of from 15-50 microns.

6. A method as in claim 1, wherein the ideal structure HBN is converted to a CBN cluster compact or CBN composite compact.

7. A method as in claim 1, wherein the ideal structure HBN is compressed into a pressed-pill before being subjected to pressure and temperature conditions suitable for conversion.

8. A method as in claim 1, wherein the ideal structure hexagonal boron nitride particles having an average particle size of about 30-50 microns.

9. A pressed-pill of a density greater than 2.00 gm/cm$^2$ which consists essentially of compressed ideal structure HBN particles.

10. A pressed-pill as in claim 9 which additionally contains 0.05 to 40 wt. % catalyst material.

11. A pressed-pill as in claim 9 which additionally contains CBN crystals in an amount of from 4-50 wt. % and has a density greater than 2.19 gm/cm$^2$.

12. A pressed-pill as in claim 9 obtained from ideal structure HBN particles having an average particle size of from 15-50 microns.

13. A CBN cluster compact obtained from HBN particles of an average particle size in the range of 15-50 microns and a particle density of 2.28 gm/cm$^2$.

* * * * *